(12) United States Patent
Patel et al.

(10) Patent No.: US 12,007,005 B2
(45) Date of Patent: Jun. 11, 2024

(54) MULTI-SPEED PLANETARY TRANSMISSION

(71) Applicant: Allison Transmission, Inc., Indianapolis, IN (US)

(72) Inventors: Nayan Patel, Avon, IN (US); Jorge F. Briceno, Brownsburg, IN (US); Conrad Rockey, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 17/802,191

(22) PCT Filed: Feb. 18, 2021

(86) PCT No.: PCT/US2021/018505
§ 371 (c)(1),
(2) Date: Aug. 25, 2022

(87) PCT Pub. No.: WO2021/183265
PCT Pub. Date: Sep. 16, 2021

(65) Prior Publication Data
US 2023/0358297 A1  Nov. 9, 2023

Related U.S. Application Data

(60) Provisional application No. 62/986,859, filed on Mar. 9, 2020.

(51) Int. Cl.
*F16H 3/66* (2006.01)

(52) U.S. Cl.
CPC ....... *F16H 3/66* (2013.01); *F16H 2200/0078* (2013.01); *F16H 2200/0086* (2013.01);
(Continued)

(58) Field of Classification Search
CPC ............... F16H 3/66; F16H 2200/0078; F16H 2200/0086; F16H 2200/2015; F16H 2200/2051
See application file for complete search history.

(56) References Cited

U.S. PATENT DOCUMENTS 3,147,643 A * 9/1964 Breting ................... F16H 3/663
475/135
4,004,473 A   1/1977 Pearce et al.
(Continued)

FOREIGN PATENT DOCUMENTS

FR   2233892 A  * 2/1975  ............... F16H 3/66
FR   2706010 A1 * 12/1994  ............... F16H 3/66
(Continued)

OTHER PUBLICATIONS

Machine translation of FR2233892A1, filed Sep. 28, 2023. (Year: 2021).*
(Continued)

*Primary Examiner* — Tisha D Lewis
(74) *Attorney, Agent, or Firm* — Faegre Drinker Biddle & Reath LLP

(57) ABSTRACT

A multi-speed transmission including a plurality of planetary gearsets and a plurality of selective couplers to achieve at least eighteen forward speed ratios and at least two reverse speed ratios is disclosed. The plurality of planetary gearsets may include a first planetary gearset, a second planetary gearset, a third planetary gearset, a fourth planetary gearset, and a fifth planetary gearset. The plurality of selective couplers may include a number of clutches and a number of brakes. The multi-speed transmission may have five planetary gearsets and eight selective couplers. The eight selective couplers may include three clutches and five brakes.

24 Claims, 2 Drawing Sheets

(52) U.S. Cl.
CPC ................ *F16H 2200/2015* (2013.01); *F16H 2200/2051* (2013.01)

(56) References Cited

U.S. PATENT DOCUMENTS

| | | |
|---|---|---|
| 4,754,665 A | 7/1988 | Vandervoort |
| 4,964,313 A | 10/1990 | Davis |
| 5,161,423 A | 11/1992 | Ore |
| 5,557,978 A | 9/1996 | McAskill |
| 6,629,470 B2 | 10/2003 | Brancolini |
| 6,960,149 B2 | 11/2005 | Ziemer |
| 8,100,034 B2 | 1/2012 | Gitt |
| 8,561,493 B2 | 10/2013 | Hoffmann |
| 8,596,157 B2 | 12/2013 | Vu |
| 8,715,128 B2 | 5/2014 | Kempf et al. |
| 8,789,433 B2 | 7/2014 | Jerwick et al. |
| 9,625,007 B2 | 4/2017 | Long et al. |
| 10,330,180 B2 | 6/2019 | Hwang et al. |
| 10,393,230 B2 | 8/2019 | Bulgrien |
| 10,584,772 B2 | 3/2020 | Dersjo et al. |
| 2008/0103015 A1 | 5/2008 | Seo |
| 2013/0217534 A1 | 8/2013 | Kirchhoffer |
| 2016/0169349 A1 | 6/2016 | Park et al. |
| 2018/0031096 A1 | 2/2018 | Blattner et al. |
| 2018/0259065 A1 | 9/2018 | Fujii et al. |
| 2019/0078661 A1 | 3/2019 | Asaoka et al. |
| 2019/0195319 A1 | 6/2019 | Kim et al. |
| 2020/0079206 A1 | 3/2020 | Ziemer et al. |
| 2023/0088352 A1* | 3/2023 | Patel .......................... F16H 3/66 |

FOREIGN PATENT DOCUMENTS

| | | |
|---|---|---|
| SE | 527108 C2 | 12/2005 |
| WO | 2018104020 A1 | 6/2018 |

OTHER PUBLICATIONS

U.S. Patent and Trademark Office; International Search Report and Written Opinion; International Application No. PCT/US21/18505; dated May 25, 2021.

SPORTAGE(AL); General Description; www.kiatechinfo.com; Jan. 28, 2011.

Eaton Fuller Heavy-Duty Transmissions TRDR0800; Driver Instructions; Sep. 2007.

* cited by examiner

MULTI-SPEED PLANETARY TRANSMISSION

RELATED APPLICATION

This application is a national stage application of PCT Application No. PCT/US2021/18505, filed Feb. 18, 2021, which claims the benefit of U.S. Provisional Patent Application Ser. No. 62/986,859, filed Mar. 9, 2020, titled MULTI-SPEED PLANETARY TRANSMISSION, the entire disclosures of which are expressly incorporated by reference herein.

FIELD OF THE DISCLOSURE

The present disclosure relates to a multi-speed transmission and in particular to a multi-speed transmission including a plurality of planetary gearsets and a plurality of selective couplers to achieve a plurality of forward speed ratios and a plurality of reverse speed ratios.

BACKGROUND OF THE DISCLOSURE

Multi-speed transmissions use a plurality of planetary gearsets, selective couplers, interconnectors, and additional elements to achieve a plurality of forward and reverse speed ratios. Exemplary multi-speed transmissions are disclosed in U.S. Pat. No. 9,625,007, Ser. No. 14/457,592, titled MULTI-SPEED TRANSMISSION, filed Aug. 12, 2014, the entire disclosure of which is expressly incorporated by reference herein.

SUMMARY

The present disclosure provides a multi-speed transmission including a plurality of planetary gearsets and a plurality of selective couplers to achieve at least eighteen forward speed ratios wherein the output member rotates in the same direction as the input member and at least two reverse speed ratios wherein the output member rotates in the opposite direction as the input member. The plurality of planetary gearsets may include a first planetary gearset, a second planetary gearset, a third planetary gearset, a fourth planetary gearset, and a fifth planetary gearset. The plurality of selective couplers may include a number of clutches and a number of brakes. In one example, the present disclosure provides a multi-speed transmission having five planetary gearsets and eight selective couplers. The eight selective couplers may include three clutches and five brakes. The eight selective couplers may be selectively engaged to establish at least eighteen forward speed ratios and at least two reverse speed ratios.

In some instances throughout this disclosure and in the claims, numeric terminology, such as first, second, third, fourth, and fifth is used in reference to various gearsets, gears, gearset components, interconnectors, selective couplers, and other components. Such use is not intended to denote an ordering of the components. Rather, numeric terminology is used to assist the reader in identifying the component being referenced and should not be narrowly interpreted as providing a specific order of components. For example, a first planetary gearset identified in the drawings may support any one of the plurality of planetary gearsets recited in the claims, including the second planetary gearset, the third planetary gearset, the fourth planetary gearset, and the fifth planetary gearset, depending on the language of the claims.

In an exemplary embodiment of the present disclosure, a transmission is provided. The transmission comprising: at least one stationary member; an input member rotatable relative to the at least one stationary member; a plurality of planetary gearsets operatively coupled to the input member; an output member operatively coupled to the input member through the plurality of planetary gearsets and rotatable relative to the at least one stationary member; and a plurality of selective couplers. Each of the plurality of planetary gearsets including a first gearset component, a second gearset component, and a third gearset component. The plurality of planetary gearsets including a first planetary gearset, a second planetary gearset, a third planetary gearset, a fourth planetary gearset, and a fifth planetary gearset. The input member is fixedly coupled to only the first planetary gearset of the plurality of planetary gearsets. The output member is fixedly coupled to only the fifth planetary gearset of the plurality of planetary gearsets. The plurality of selective couplers include a first number of clutches and a second number of brakes. The second number is greater than the first number. The plurality of selective couplers selectively coupling the fourth planetary gearset to the fifth planetary gearset independent of the output member.

In an example thereof, the plurality of selective couplers includes a first selective coupler which, when engaged, fixedly couples the input member to the third planetary gearset of the plurality of planetary gearsets. In a variation thereof, the third planetary gearset of the plurality of planetary gearsets is fixedly coupled to the first planetary gearset of the plurality of planetary gearsets independent of the first selective coupler. In another variation thereof, when the first selective coupler is engaged the input member is further fixedly coupled to the fourth planetary gearset of the plurality of planetary gearsets. In a further variation thereof, the third planetary gearset of the plurality of planetary gearsets is fixedly coupled to the first planetary gearset of the plurality of planetary gearsets independent of the first selective coupler. In still a further variation thereof, the plurality of selective couplers includes a second selective coupler which, when engaged, fixedly couples the input member to the fourth planetary gearset of the plurality of planetary gearsets independent of third planetary gearset of the plurality of planetary gearsets. In still another variation thereof, the plurality of selective couplers includes a second selective coupler which, when engaged, fixedly couples the input member to the fourth planetary gearset of the plurality of planetary gearsets.

In a further example thereof, the transmission further comprises a first interconnector which fixedly couples the second gearset component of the first planetary gearset, the second gearset component of the second planetary gearset, and the third gearset component of the third planetary gearset together. In a variation thereof, the transmission further comprises a second interconnector which fixedly couples the third gearset component of the first planetary gearset and the first gearset component of the second planetary gearset together. In another variation thereof, the transmission further comprises a third interconnector which fixedly couples the second gearset component of the third planetary gearset and the third gearset component of the fourth planetary gearset together; a fourth interconnector which fixedly couples the first gearset component of the third planetary gearset and the first planetary gearset component of the fourth planetary gearset together; and a fifth interconnector which fixedly couples the second gearset component of the fourth planetary gearset and the first gearset component of the fifth planetary gearset together.

In yet a further example thereof, the transmission further comprises a second interconnector which fixedly couples the third gearset component of the first planetary gearset and the first gearset component of the second planetary gearset together.

In still another example thereof, the second number is 2 more than the first number. In a variation thereof, the second number is 5 and the first number is 3.

In a further still example thereof, the plurality of selective couplers includes: a first selective coupler which, when engaged, fixedly couples the input member and the first gearset component of the first planetary gearset to the first gearset component of the third planetary gearset and the first gearset component of the fourth planetary gearset; a second selective coupler which, when engaged, fixedly couples the input member and the first gearset component of the first planetary gearset to the second gearset component of the third planetary gearset and the third gearset component of the fourth planetary gearset; a third selective coupler which, when engaged, fixedly couples the third gearset component of the first planetary gearset and the first gearset component of the second planetary gearset to the at least one stationary member; a fourth selective coupler which, when engaged, fixedly couples the second gearset component of the first planetary gearset, the second gearset component of the second planetary gearset, and the third gearset component of the third planetary gearset to the at least one stationary member; a fifth selective coupler which, when engaged, fixedly couples the second gearset component of the third planetary gearset and the third gearset component of the fourth planetary gearset to the at least one stationary member; a sixth selective coupler which, when engaged, fixedly couples the third gearset component of the second planetary gearset to the at least one stationary member; a seventh selective coupler which, when engaged, fixedly couples the second gearset component of the fourth planetary gearset and the first gearset component of the fifth planetary gearset to the second gearset component of the fifth planetary gearset; and an eighth selective coupler which, when engaged, fixedly couples the third gearset component of the fifth planetary gearset to the at least one stationary member.

In still a further yet example thereof, each of the first planetary gearset, the second planetary gearset, the third planetary gearset, the fourth planetary gearset, and the fifth planetary gearset is a simple planetary gearset. In a variation thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear; the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier; and the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

In another still example thereof, the at least one stationary member includes a housing, the housing having a first end and a second end, wherein the input member is accessible proximate the first end of the housing; the output member is accessible proximate the second end of the housing; the first planetary gearset, the second planetary gearset, the third planetary gearset, and the fourth planetary gearset are positioned between the first end of the housing and the fifth planetary gearset; and the fifth planetary gearset is positioned between the first planetary gearset, the second planetary gearset, the third planetary gearset, and the fourth planetary gearset and the second end of the housing. In a variation thereof, the first planetary gearset is positioned between the first end of the housing and the second planetary gearset; the second planetary gearset is positioned between the first planetary gearset and the third planetary gearset; the third planetary gearset is positioned between the second planetary gearset and the fourth planetary gearset; and the fourth planetary gearset is positioned between the third planetary gearset and the fifth planetary gearset.

In yet another still example thereof, the plurality of selective couplers are selectively engaged in a plurality of combinations to establish at least eighteen forward speed ratios and at least two reverse speed ratios between the input member and the output member, each of the plurality of combinations having at least three of the plurality of selective couplers engaged.

According to another exemplary embodiment of the present disclosure, a transmission is provided. The transmission comprises at least one stationary member, an input member rotatable relative to the at least one stationary member, a plurality of planetary gearsets operatively coupled to the input member, an output member operatively coupled to the input member through the plurality of planetary gearsets and rotatable relative to the at least one stationary member, a first interconnector, a second interconnector, a third interconnector, a fourth interconnector, a fifth interconnector, and a plurality of selective couplers. The plurality of planetary gearsets includes a first gearset component, a second gearset component, and a third gearset component. The plurality of planetary gearsets includes a first planetary gearset, a second planetary gearset, a third planetary gearset, a fourth planetary gearset, and a fifth planetary gearset. The input member is fixedly coupled to the first gearset component of the first planetary gearset. The output member is fixedly coupled to the second gearset component of the fifth planetary gearset. The first interconnector fixedly couples the second gearset component of the first planetary gearset, the second gearset component of the second planetary gearset, and the third gearset component of the third planetary gearset together. The second interconnector fixedly couples the third gearset component of the first planetary gearset and the first gearset component of the second planetary gearset together. The third interconnector fixedly couples the second gearset component of the third planetary gearset and the third gearset component of the fourth planetary gearset together. The fourth interconnector fixedly couples the first gearset component of the third planetary gearset and the first planetary gearset component of the fourth planetary gearset together. The fifth interconnector fixedly couples the second gearset component of the fourth planetary gearset and the first gearset component of the fifth planetary gearset together. The plurality of selective couplers includes a first selective coupler which, when engaged, fixedly couples the input member and the first gearset component of the first planetary gearset to the first gearset component of the third planetary gearset and the first gearset component of the fourth planetary gearset, a second selective coupler which, when engaged, fixedly couples the input member and the first gearset component of the first planetary gearset to the second gearset component of the third planetary gearset and the third gearset component of the fourth planetary gearset, a third selective coupler which, when engaged, fixedly couples the third gearset component of the first planetary gearset and the first gearset component of the second planetary gearset to the at least one stationary member, a fourth selective coupler which, when engaged, fixedly couples the second gearset component of the first planetary gearset, the second gearset component of the second planetary gearset, and the third gearset component of the third planetary gearset to the at least one stationary member; a fifth selective coupler which, when engaged, fixedly couples the second gearset component of the third planetary gearset and the third gearset component of the fourth planetary gearset to the at least one stationary member; a sixth selective coupler which, when engaged, fixedly couples the third gearset component of the second planetary gearset to the at least one stationary member; a seventh selective coupler which, when engaged, fixedly couples the second gearset component of the fourth planetary gearset and the first gearset component of the fifth planetary gearset to the second gearset component of the fifth planetary gearset; and an eighth selective coupler which, when engaged, fixedly couples the third gearset component of the fifth planetary gearset to the at least one stationary member.

In an example thereof, each of the first planetary gearset, the second planetary gearset, the third planetary gearset, the fourth planetary gearset, and the fifth planetary gearset is a simple planetary gearset. In a variation thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear; the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier; and the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

In another example thereof, the at least one stationary member includes a housing, the housing having a first end and a second end, wherein the input member is accessible proximate the first end of the housing; the output member is accessible proximate the second end of the housing; the first planetary gearset, the second planetary gearset, the third planetary gearset, and the fourth planetary gearset are positioned between the first end of the housing and the fifth planetary gearset; and the fifth planetary gearset is positioned between the first planetary gearset, the second planetary gearset, the third planetary gearset, and the fourth planetary gearset and the second end of the housing. In a variation thereof, the first planetary gearset is positioned between the first end of the housing and the second planetary gearset; the second planetary gearset is positioned between the first planetary gearset and the third planetary gearset; the third planetary gearset is positioned between the second planetary gearset and the fourth planetary gearset; and the fourth planetary gearset is positioned between the third planetary gearset and the fifth planetary gearset.

In yet a further still example thereof, the plurality of selective couplers are selectively engaged in a plurality of combinations to establish at least eighteen forward speed ratios and at least two reverse speed ratios between the input member and the output member, each of the plurality of combinations having at least three of the plurality of selective couplers engaged.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION

Figure 1:
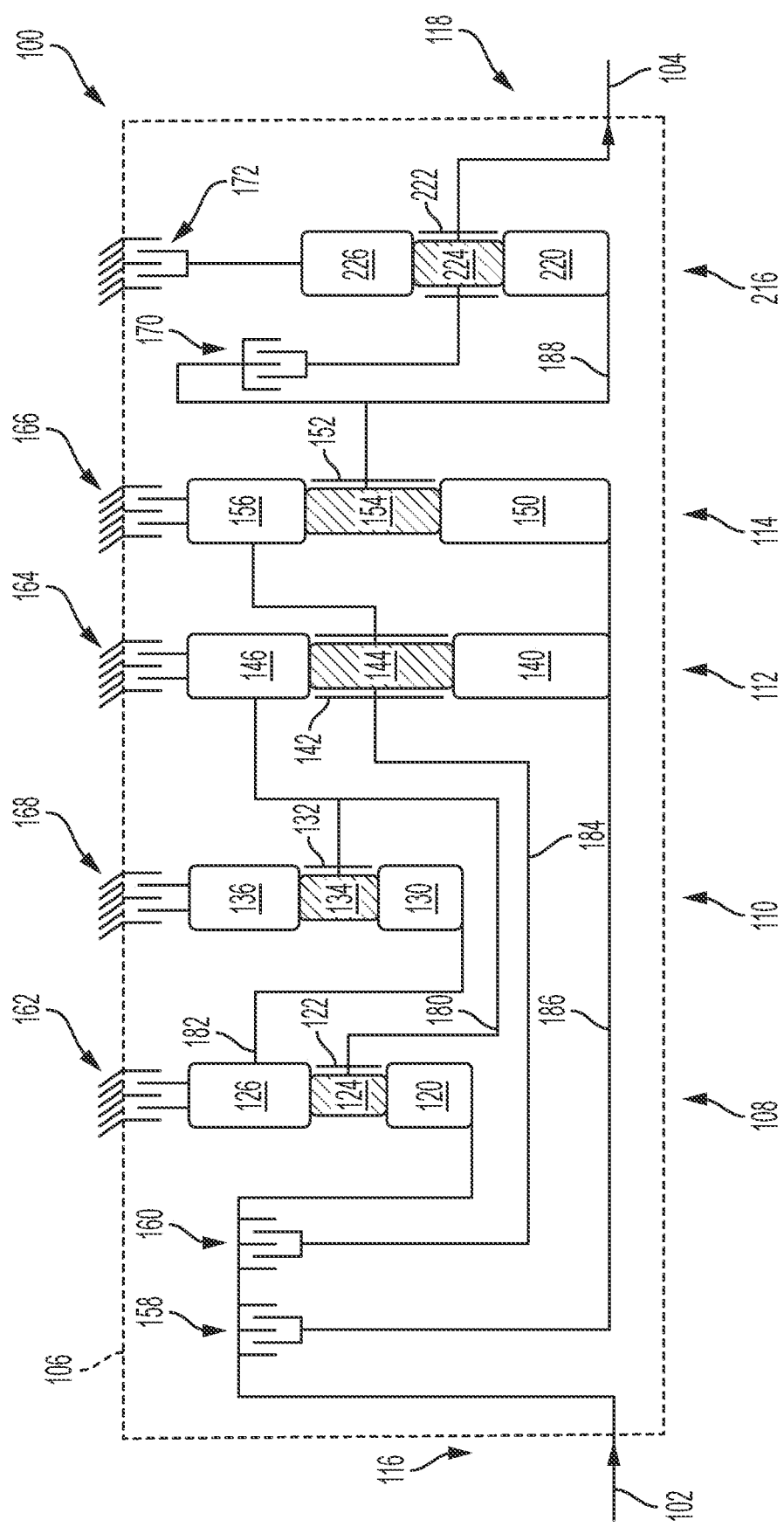
FIG. 1 is a diagrammatic view of an exemplary multi-speed transmission including five planetary gearsets and eight selective couplers.

For the purposes of promoting an understanding of the principles of the present disclosure, reference is now made to the embodiment illustrated in the drawings, which is described below. The embodiment disclosed below is not intended to be exhaustive or limit the present disclosure to the precise form disclosed in the following detailed description. Rather, the embodiment is chosen and described so that others skilled in the art may utilize its teachings. Therefore, no limitation of the scope of the present disclosure is thereby intended. Corresponding reference characters indicate corresponding parts throughout the several views.

In the disclosed transmission embodiment, selective couplers are disclosed. A selective coupler is a device which may be actuated to fixedly couple two or more components together. A selective coupler fixedly couples two or more components to rotate together as a unit when the selective coupler is in an engaged configuration. Further, the two or more components may be rotatable relative to each other when the selective coupler is in a disengaged configuration. The terms "couples", "coupled", "coupler" and variations thereof are used to include both arrangements wherein the two or more components are in direct physical contact and arrangements wherein the two or more components are not in direct contact with each other (e. g., the components are "coupled" via at least a third component), but yet still cooperate or interact with each other.

A first exemplary selective coupler is a clutch. A clutch couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch.

A second exemplary selective coupler is a brake. A brake couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers may be actively controlled devices or passive devices. Exemplary actively controlled devices include hydraulically actuated clutch or brake elements and electrically actuated clutch or brake elements. Additional details regarding systems and methods for controlling selective couplers are disclosed in the above-incorporated U.S. Pat. No. 9,625,007.

In addition to coupling through selective couplers, various components of the disclosed transmission embodiments may be fixedly coupled together continuously throughout the operation of the disclosed transmissions. Components may be fixedly coupled together either permanently or removably. Components may be fixedly coupled together through spline connections, press fitting, fasteners, welding, machined or formed functional portions of a unitary piece, or other suitable methods of connecting components.

The disclosed transmission embodiments include a plurality of planetary gearsets. Each planetary gearset includes at least four components: a sun gear; a ring gear; a plurality of planet gears; and a carrier that is rotatably coupled to and carries the planet gears. In the case of a simple planetary gearset, the teeth of the sun gear are intermeshed with the teeth of the planet gears which are in turn intermeshed with the teeth of the ring gear. Each of these components may also be referred to as a gearset component. It will be apparent to one of skill in the art that some planetary gearsets may include further components than those explicitly identified. For example, one or more of the planetary gearsets may include two sets of planet gears. A first set of planet gears may intermesh with the sun gear while the second set of planet gears intermesh with the first set of planet gears and the ring gear. Both sets of planet gears are carried by the planet carrier.

One or more rotating components, such as shafts, drums, hubs, and other mechanical components, may be collectively referred to as an interconnector when the one or more components are fixedly coupled together. Interconnectors may further be fixedly coupled to one or more gearset components and/or one or more selective couplers.

An input member of the disclosed transmission embodiments is rotated by a prime mover. Exemplary prime movers include internal combustion engines, electric motors, hybrid power systems, and other suitable power systems. In one embodiment, the prime mover indirectly rotates the input member through a clutch and/or a torque converter. An output member of the disclosed transmission embodiments provides rotational power to one or more working components. Exemplary working components include one or more drive wheels of a motor vehicle, a power take-off shaft, a pump, and other suitable devices. The output member is rotated based on the interconnections of the gearset components and the selective couplers of the transmission. By changing the interconnections of the gearset components and the selective couplers, a rotation speed of the output member may be varied from a rotation speed of the input member.

The disclosed transmission embodiment is capable of transferring torque from the input member to the output member and rotating the output member in at least eighteen forward gear or speed ratios relative to the input member, illustratively eighteen forward gear or speed ratios, and in at least two reverse gear or speed ratios relative to the input member, illustratively two reverse gear or speed ratios. The architecture disclosed herein may be utilized to achieve various gear ratios based on the characteristics of the gearsets utilized. Exemplary characteristics include respective gear diameters, the number of gear teeth, and the configurations of the various gears.

FIG. 1 is a diagrammatic representation of a multi-speed transmission 100. Multi-speed transmission 100 includes an input member 102 and an output member 104. Each of input member 102 and output member 104 is rotatable relative to at least one stationary member 106. An exemplary input member 102 is an input shaft or other suitable rotatable component. An exemplary output member 104 is an output shaft or other suitable rotatable component. An exemplary stationary member 106 is a housing of multi-speed transmission 100. The housing may include several components coupled together.

Multi-speed transmission 100 includes a plurality of planetary gearsets, illustratively a first planetary gearset 108, a second planetary gearset 110, a third planetary gearset 112, a fourth planetary gearset 114, and a fifth planetary gearset 216. In one embodiment, additional planetary gearsets may be included. Further, although first planetary gearset 108, second planetary gearset 110, third planetary gearset 112, fourth planetary gearset 114, and fifth planetary gearset 216 are illustrated as simple planetary gearsets, it is contemplated that compound planetary gearsets may be included in some embodiments.

In one embodiment, multi-speed transmission 100 is arranged as illustrated in FIG. 1, with first planetary gearset 108 positioned between a first location or end 116 at which input member 102 enters stationary member 106 and second planetary gearset 110, second planetary gearset 110 is positioned between first planetary gearset 108 and third planetary gearset 112, third planetary gearset 112 is positioned between second planetary gearset 110 and fourth planetary gearset 114, fourth planetary gearset 114 is positioned between third planetary gearset 112 and fifth planetary gearset 216, and fifth planetary gearset 216 is positioned between fourth planetary gearset 114 and a second location or end 118 at which output member 104 exits stationary member 106. In alternative embodiments, first planetary gearset 108, second planetary gearset 110, third planetary gearset 112, fourth planetary gearset 114, and fifth planetary gearset 216 are arranged in any order relative to location 116 and location 118. In embodiments, each of first planetary gearset 108, second planetary gearset 110, third planetary gearset 112, fourth planetary gearset 114, and fifth planetary gearset 216 are axially aligned. In one example, input member 102 and output member 104 are also axially aligned with first planetary gearset 108, second planetary gearset 110, third planetary gearset 112, fourth planetary gearset 114, and fifth planetary gearset 216. In alternative embodiments, one or more of input member 102, output member 104, first planetary gearset 108, second planetary gearset 110, third planetary gearset 112, fourth planetary gearset 114, and fifth planetary gearset 216 are offset and not axially aligned with the remainder.

First planetary gearset 108 includes a sun gear 120, a planet carrier 122 supporting a plurality of planet gears 124, and a ring gear 126. Second planetary gearset 110 includes a sun gear 130, a planet carrier 132 supporting a plurality of planet gears 134, and a ring gear 136. Third planetary gearset 112 includes a sun gear 140, a planet carrier 142 supporting a plurality of planet gears 144, and a ring gear 146. Fourth planetary gearset 114 includes a sun gear 150, a planet carrier 152 supporting a plurality of planet gears 154, and a ring gear 156. Fifth planetary gearset 216 includes a sun gear 220, a planet carrier 222 supporting a plurality of planet gears 224, and a ring gear 226.

Multi-speed transmission 100 further includes a plurality of selective couplers, illustratively a first selective coupler 158, a second selective coupler 160, a third selective coupler 162, a fourth selective coupler 164, a fifth selective coupler 166, a sixth selective coupler 168, a seventh selective coupler 170, and an eighth selective coupler 172. In the illustrated embodiment, first selective coupler 158, second selective coupler 160, and seventh selective coupler 170 are clutches third selective coupler 162, fourth selective coupler 164, fifth selective coupler 166, sixth selective coupler 168, and eighth selective coupler 172 are brakes. The axial locations of the clutches and brakes relative to the plurality of planetary gearsets may be altered from the illustrated axial locations.

Multi-speed transmission 100 includes several components that are illustratively shown as being fixedly coupled together. Input member 102 is fixedly coupled to sun gear 120 of first planetary gearset 108, first selective coupler 158, and second selective coupler 160. Output member 104 is fixedly coupled to planet carrier 222 of fifth planetary gearset 216 and seventh selective coupler 170. Planet carrier 122 of first planetary gearset 108 is fixedly coupled to planet carrier 132 of second planetary gearset 110 and ring gear 146 of third planetary gearset 112. Ring gear 126 of first planetary gearset 108 is fixedly coupled to sun gear 130 of second planetary gearset 110 and third selective coupler 162. Ring gear 136 of second planetary gearset 110 is fixedly coupled to sixth selective coupler 168. Sun gear 140 of third planetary gearset 112 is fixedly coupled to sun gear 150 of fourth planetary gearset 114 and first selective coupler 158. Planet carrier 142 of third planetary gearset 112 is fixedly coupled to ring gear 156 of fourth planetary gearset 114 and second selective coupler 160. Planet carrier 152 of fourth planetary gearset 114 is fixedly coupled to sun gear 220 of fifth planetary gearset 216 and seventh selective coupler 170. Ring gear 156 of planetary gearset 114 is fixedly coupled to fifth selective coupler 166. Ring gear 226 of fifth planetary gearset 216 is fixedly coupled to eighth selective coupler 172. In alternative embodiments, one or more of the components fixedly coupled together are selectively coupled together through one or more selective couplers.

Multi-speed transmission 100 may be described as having seven interconnectors. Input member 102 is a first interconnector that both provides input torque to multi-speed transmission 100 and fixedly couples sun gear 120 of first planetary gearset 108, first selective coupler 158, and second selective coupler 160. Output member 104 is a second interconnector that both provides output torque from multi-speed transmission 100 and fixedly couples planet carrier 222 of fifth planetary gearset 216 and seventh selective coupler 170. A third interconnector 180 fixedly couples planet carrier 122 of first planetary gearset 108, planet carrier 132 of second planetary gearset 110, and ring gear 146 of third planetary gearset 112 together. A fourth interconnector 182 fixedly couples ring gear 126 of first planetary gearset 108 to sun gear 130 of second planetary gearset 110. A fifth interconnector 184 fixedly couples ring gear 156 of fourth planetary gearset 114, planet carrier 142 of third planetary gearset 112, and second selective coupler 160 together. A sixth interconnector 186 fixedly couples sun gear 140 of third planetary gearset 112, sun gear 150 of fourth planetary gearset 114, and first selective coupler 158 together. A seventh interconnector 188 fixedly couples planet carrier 152 of fourth planetary gearset 114, sun gear 220 of fifth planetary gearset 216, and seventh selective coupler 170 together.

Multi-speed transmission 100 further includes several components that are illustratively shown as being selectively coupled together through selective couplers. First selective coupler 158, when engaged, fixedly couples a plurality of sun gears of first planetary gearset 108, second planetary gearset 110, third planetary gearset 112, fourth planetary gearset 114, and fifth planetary gearset 216 to input member 102. More specifically, first selective coupler 158, when engaged, fixedly couples input member 102 and sun gear 120 of first planetary gearset 108 to sun gear 140 of third planetary gearset 112 and sun gear 150 of fourth planetary gearset 114. When first selective coupler 158 is disengaged, input member 102 and sun gear 120 of first planetary gearset 108 may rotate relative to sun gear 140 of third planetary gearset 112, and sun gear 150 of fourth planetary gearset 114.

Second selective coupler 160, when engaged, fixedly couples input member 102 and sun gear 120 of first planetary gearset 108 to planet carrier 142 of third planetary gearset 112 and ring gear 156 of fourth planetary gearset 114. When second selective coupler 160 is disengaged, input member 102 and sun gear 120 of first planetary gearset 108 may rotate relative to planet carrier 142 of third planetary gearset 112 and ring gear 156 of fourth planetary gearset 114.

Third selective coupler 162, when engaged, fixedly couples ring gear 126 of first planetary gearset 108 and sun gear 130 of second planetary gearset 110 to stationary member 106. When third selective coupler 162 is disengaged, ring gear 126 of first planetary gearset 108 and sun gear 130 of second planetary gearset 110 may rotate relative to stationary member 106.

Fourth selective coupler 164, when engaged, fixedly couples ring gear 146 of third planetary gearset 112, planet carrier 132 of second planetary gearset 110, and planet carrier 122 of first planetary gearset 108 to stationary member 106. When fourth selective coupler 164 is disengaged, ring gear 146 of third planetary gearset 112, planet carrier 132 of second planetary gearset 110, and planet carrier 122 of first planetary gearset 108 may rotate relative to stationary member 106.

Fifth selective coupler 166, when engaged, fixedly couples ring gear 156 of fourth planetary gearset 114 and planet carrier 142 of third planetary gearset 112 to stationary member 106. When fifth selective coupler 166 is disengaged, ring gear 156 of fourth planetary gearset 114 and planet carrier 142 of third planetary gearset 112 may rotate relative to stationary member 106.

Sixth selective coupler 168, when engaged, fixedly couples ring gear 136 of second planetary gearset 110 to stationary member 106. When sixth selective coupler 168 is disengaged, ring gear 136 of second planetary gearset 110 may rotate relative to stationary member 106.

Seventh selective coupler 170, when engaged, fixedly couples planet carrier 152 of fourth planetary gearset 114 and sun gear 220 of fifth planetary gearset 216 to planet carrier 222 of fifth planetary gearset 216 and output member 104. When seventh selective coupler 170 is engaged, planet carrier 222 and sun gear 220 of fifth planetary gearset 216 are locked together. Therefore, sun gear 220, planet carrier 222, and ring gear 226 all rotate together as a single unit. The same effect may be realized by coupling any two of sun gear 220, planet carrier 222, and ring gear 226 together. When seventh selective coupler 170 is disengaged, planet carrier 152 of fourth planetary gearset 114 and sun gear 220 of fifth planetary gearset 216 may rotate relative to planet carrier 222 and output member 104.

Eighth selective coupler 172, when engaged, fixedly couples ring gear 226 of fifth planetary gearset 216 to stationary member 106. When eighth selective coupler 172 is disengaged, ring gear 226 of fifth planetary gearset 216 may rotate relative to stationary member 106.

By engaging various combinations of first selective coupler 158, second selective coupler 160, third selective coupler 162, fourth selective coupler 164, fifth selective coupler 166, sixth selective coupler 168, seventh selective coupler 170, and eighth selective coupler 172, additional components of multi-speed transmission 100 may be fixedly coupled together.

The plurality of planetary gearsets and the plurality of selective couplers of multi-speed transmission 100 may be interconnected in various arrangements to provide torque from input member 102 to output member 104 in at least eighteen forward gear or speed ratios and at least two reverse gear or speed ratios. In the exemplary embodiment shown, selective couplers 158-172 are selectively engageable to establish the at least eighteen forward gear or speed ratios and the at least two reverse gear or speed ratio. In the exemplary embodiment shown, selective couplers 170, 172 are selectively engaged to add additional forward gear or speed ratios. More specifically, the selective engagement of selective coupler 170, 172 doubles the number of forward gear or speed ratios provided by first planetary gearset 108, second planetary gearset 110, third planetary gearset 112, fourth planetary gearset 114, fifth planetary gearset 216, and selective couplers 158-168.

Figure 2:
FIG. 2 is a truth table illustrating the selective engagement of the eight selective couplers of FIG. 1 to provide eighteen forward gear or speed ratios and two reverse gear or speed ratios of the multi-speed transmission of FIG. 1.

Referring to FIG. 2, an exemplary truth table 200 is shown that provides the state of each of first selective coupler 158, second selective coupler 160, third selective coupler 162, fourth selective coupler 164, fifth selective coupler 166, sixth selective coupler 168, seventh selective coupler 170, and eighth selective coupler 172 for eighteen different forward gear or speed ratios and two reverse gear or speed ratios. Each row corresponds to a given interconnection arrangement for transmission 100. The first column provides the gear range (1 Rev-18$^{th}$ gear ratios). The remaining columns illustrate which ones of the selective couplers 158-172 are engaged ("X" indicates engaged) and which ones of selective couplers 158-172 are disengaged ("(blank)" indicates disengaged). FIG. 2 is only one example of any number of truth tables possible for achieving at least eighteen forward speed or gear ratios and at least two reverse speed or gear ratios.

In the example of FIG. 2, a first reverse gear or speed ratio (shown as 1$^{st}$ Rev) in the exemplary truth table 200 is achieved by having third selective coupler 162, fifth selective coupler 166, and eighth selective coupler 172 are in an engaged configuration and first selective coupler 158, second selective coupler 160, fourth selective coupler 164, sixth selective coupler 168, and seventh selective coupler 170 are in a disengaged configuration. In the first reverse gear or speed ratio, the rotational direction of output member 104 is reversed from the rotational direction of input member 102.

A second or subsequent reverse gear or speed ratio (shown as 2$^{nd}$ Rev) in exemplary truth table 200 of FIG. 2 is achieved by having third selective coupler 162, fifth selective coupler 166, and seventh selective coupler 170 in an engaged configuration and first selective coupler 158, second selective coupler 160, fourth selective coupler 164, sixth selective coupler 168, and eighth selective coupler 172 in a disengaged configuration. Therefore, when transitioning between the first reverse gear or speed ratio and the second reverse gear or speed ratio, eighth selective coupler 172 is placed in the disengaged configuration and seventh selective coupler 170 is placed in the engaged configuration. In the second reverse gear or speed ratio, the rotational direction of output member 104 is reversed from the rotational direction of input member 102.

To place multi-speed transmission 100 in neutral (N), all of first selective coupler 158, second selective coupler 160, third selective coupler 162, fourth selective coupler 164, fifth selective coupler 166, sixth selective coupler 168, seventh selective coupler 170, and eighth selective coupler 172 are in the disengaged configuration. One or more of first selective coupler 158, second selective coupler 160, third selective coupler 162, fourth selective coupler 164, fifth selective coupler 166, sixth selective coupler 168, seventh selective coupler 170, and eighth selective coupler 172 may remain engaged in neutral (N) as long as the combination of first selective coupler 158, second selective coupler 160, third selective coupler 162, third selective coupler 162, fifth selective coupler 166, sixth selective coupler 168, seventh selective coupler 170, and eighth selective coupler 172 does not transmit torque from input member 102 to output member 104.

A first forward gear or speed ratio (shown as 1$^{st}$) in exemplary truth table 200 of FIG. 2 is achieved by having fifth selective coupler 166, sixth selective coupler 168, and seventh selective coupler 170 in an engaged configuration and first selective coupler 158, second selective coupler 160, third selective coupler 162, fourth selective coupler 164, and eighth selective coupler 172 in a disengaged configuration.

A second or subsequent forward gear or speed ratio (shown as 2$^{nd}$) in exemplary truth table 200 of FIG. 2 is achieved by having first selective coupler 158, fifth selective coupler 166, and seventh selective coupler 170 in an engaged configuration and second selective coupler 160, third selective coupler 162, fourth selective coupler 164, sixth selective coupler 168, and eighth selective coupler 172 in a disengaged configuration. Therefore, when transitioning between the first forward gear or speed ratio and the second forward gear or speed ratio, sixth selective coupler 168 is placed in the disengaged configuration and first selective coupler 158 is placed in the engaged configuration.

A third or subsequent forward gear or speed ratio (shown as 3$^{rd}$) in exemplary truth table 200 of FIG. 2 is achieved by having first selective coupler 158, sixth selective coupler 168, and seventh selective coupler 170 in an engaged configuration and second selective coupler 160, third selective coupler 162, fourth selective coupler 164, fifth selective coupler 166, and eighth selective coupler 172 in a disengaged configuration. Therefore, when transitioning between the second forward gear or speed ratio and the third forward gear or speed ratio, fifth selective coupler 166 is placed in the disengaged configuration and sixth selective coupler 168 is placed in the engaged configuration.

A fourth or subsequent forward gear or speed ratio (shown as 4$^{th}$) in exemplary truth table 200 of FIG. 2 is achieved by having first selective coupler 158, fourth selective coupler 164, and seventh selective coupler 170 in an engaged configuration and second selective coupler 160, third selective coupler 162, fifth selective coupler 166, sixth selective coupler 168, and eighth selective coupler 172 in a disengaged configuration. Therefore, when transitioning between the third forward gear or speed ratio and the fourth forward gear or speed ratio, sixth selective coupler 168 is placed in the disengaged configuration and fourth selective coupler 164 is placed in the engaged configuration.

A fifth or subsequent forward gear or speed ratio (shown as 5$^{th}$) in exemplary truth table 200 of FIG. 2 is achieved by having first selective coupler 158, third selective coupler 162, and seventh selective coupler 170 in an engaged configuration and second selective coupler 160, fourth selective coupler 164, fifth selective coupler 166, sixth selective coupler 168, and eighth selective coupler 172 in a disengaged configuration. Therefore, when transitioning between the fourth forward gear or speed ratio and the fifth forward gear or speed ratio, fourth selective coupler 164 is placed in the disengaged configuration and third selective coupler 162 is placed in the engaged configuration.

A sixth or subsequent forward gear or speed ratio (shown as 6$^{th}$) in exemplary truth table 200 of FIG. 2 is achieved by having first selective coupler 158, second selective coupler 160, and seventh selective coupler 170 in an engaged configuration and third selective coupler 162, fourth selective coupler 164, fifth selective coupler 166, sixth selective coupler 168, and eighth selective coupler 172 in a disengaged configuration. Therefore, when transitioning between the fifth forward gear or speed ratio and the sixth forward gear or speed ratio, third selective coupler 162 is placed in the disengaged configuration and second selective coupler 160 is placed in the engaged configuration.

A seventh or subsequent forward gear or speed ratio (shown as 7$^{th}$) in exemplary truth table 200 of FIG. 2 is achieved by having second selective coupler 160, third selective coupler 162, and seventh selective coupler 170 in an engaged configuration and first selective coupler 158, fourth selective coupler 164, fifth selective coupler 166, sixth selective coupler 168, and eighth selective coupler 172 in a disengaged configuration. Therefore, when transitioning between the sixth forward gear or speed ratio and the seventh forward gear or speed ratio, first selective coupler 158 is placed in the disengaged configuration and third selective coupler 162 is placed in the engaged configuration.

An eighth or subsequent forward gear or speed ratio (shown as 8$^{th}$) in exemplary truth table 200 of FIG. 2 is achieved by having second selective coupler 160, fourth selective coupler 164, and seventh selective coupler 170 in an engaged configuration and first selective coupler 158, third selective coupler 162, fifth selective coupler 166, sixth selective coupler 168, and eighth selective coupler 172 in a disengaged configuration. Therefore, when transitioning between the seventh forward gear or speed ratio and the eighth forward gear or speed ratio, third selective coupler 162 is placed in the disengaged configuration and fourth selective coupler 164 is placed in the engaged configuration.

A ninth or subsequent forward gear or speed ratio (shown as 9$^{th}$) in exemplary truth table 200 of FIG. 2 is achieved by having second selective coupler 160, sixth selective coupler 168, and seventh selective coupler 170 in an engaged configuration and first selective coupler 158, third selective coupler 162, fourth selective coupler 164, fifth selective coupler 166, and eighth selective coupler 172 in a disengaged configuration. Therefore, when transitioning between the eighth forward gear or speed ratio and the ninth forward gear or speed ratio, fourth selective coupler 164 is placed in the disengaged configuration and sixth selective coupler 168 is placed in the engaged configuration.

A tenth or subsequent forward gear or speed ratio (shown as 10$^{th}$) in exemplary truth table 200 of FIG. 2 is achieved by having fifth selective coupler 166, sixth selective coupler 168, and eighth selective coupler 172 in an engaged configuration and first selective coupler 158, second selective coupler 160, third selective coupler 162, fourth selective coupler 164, and seventh selective coupler 170 in a disengaged configuration. Therefore, when transitioning between the ninth forward gear or speed ratio and the tenth forward gear or speed ratio, second selective coupler 160 and seventh selective coupler 170 are placed in the disengaged configuration and fifth selective coupler 166 and eighth selective coupler 172 are placed in the engaged configuration. In the exemplary embodiment shown, placing both second selective coupler 160 and seventh selective coupler 170 in the disengaged configuration and both fifth selective coupler 166 and eighth selective coupler 172 in the engaged configuration occurs simultaneously. It is contemplated, however, that this transition may be staged.

An eleventh or subsequent forward gear or speed ratio (shown as 11$^{th}$) in exemplary truth table 200 of FIG. 2 is achieved by having first selective coupler 158, fifth selective coupler 166, and seventh selective coupler 170 in an engaged configuration and second selective coupler 160, third selective coupler 162, fourth selective coupler 164, sixth selective coupler 168, and eighth selective coupler 172 in a disengaged configuration. Therefore, when transitioning between the tenth forward gear or speed ratio and the eleventh forward gear or speed ratio, sixth selective coupler 168 is placed in the disengaged configuration and first selective coupler 158 is placed in the engaged configuration.

A twelfth or subsequent forward gear or speed ratio (shown as 12$^{th}$) in exemplary truth table 200 of FIG. 2 is achieved by having first selective coupler 158, sixth selective coupler 168, and eighth selective coupler 172 in an engaged configuration and second selective coupler 160, third selective coupler 162, fourth selective coupler 164, fifth selective coupler 166, and seventh selective coupler 170 in a disengaged configuration. Therefore, when transitioning between the eleventh forward gear or speed ratio and the twelfth forward gear or speed ratio, fifth selective coupler 166 is placed in the disengaged configuration and sixth selective coupler 168 is placed in the engaged configuration.

A thirteenth or subsequent forward gear or speed ratio (shown as 13$^{th}$) in exemplary truth table 200 of FIG. 2 is achieved by having first selective coupler 158, fourth selective coupler 164, and eighth selective coupler 172 in an engaged configuration and second selective coupler 160, third selective coupler 162, fifth selective coupler 166, sixth selective coupler 168, and seventh selective coupler 170 in a disengaged configuration. Therefore, when transitioning between the twelfth forward gear or speed ratio and the thirteenth forward gear or speed ratio, sixth selective coupler 168 is placed in the disengaged configuration and fourth selective coupler 164 is placed in the engaged configuration.

A fourteenth or subsequent forward gear or speed ratio (shown as 14$^{th}$) in exemplary truth table 200 of FIG. 2 is achieved by having first selective coupler 158, third selective coupler 162, and eighth selective coupler 172 in an engaged configuration and second selective coupler 160, fourth selective coupler 164, fifth selective coupler 166, sixth selective coupler 168, and seventh selective coupler 170 in a disengaged configuration. Therefore, when transitioning between the thirteenth forward gear or speed ratio and the fourteenth forward gear or speed ratio, fourth selective coupler 164 is placed in the disengaged configuration and third selective coupler 162 is placed in the engaged configuration.

A fifteenth or subsequent forward gear or speed ratio (shown as 15$^{th}$) in exemplary truth table 200 of FIG. 2 is achieved by having first selective coupler 158, second selective coupler 160, and eighth selective coupler 172 in an engaged configuration and third selective coupler 162, fourth selective coupler 164, fifth selective coupler 166, sixth selective coupler 168, and seventh selective coupler 170 in a disengaged configuration. Therefore, when transitioning between the fourteenth forward gear or speed ratio and the fifteenth forward gear or speed ratio, third selective coupler 162 is placed in the disengaged configuration and second selective coupler 160 is placed in the engaged configuration.

A sixteenth or subsequent forward gear or speed ratio (shown as 16$^{th}$) complementary to the seventh forward gear or speed ratio in exemplary truth table 200 of FIG. 2 is achieved by having second selective coupler 160, third selective coupler 162, and eighth selective coupler 172 in an engaged configuration and first selective coupler 158, fourth selective coupler 164, fifth selective coupler 166, sixth selective coupler 168, and seventh selective coupler 170 in a disengaged configuration. Therefore, when transitioning between the fifteenth forward gear or speed ratio and the sixteenth forward gear or speed ratio, first selective coupler 158 is placed in the disengaged configuration and third selective coupler 162 is placed in the engaged configuration.

A seventeenth or subsequent forward gear or speed ratio (shown as 17$^{th}$) in exemplary truth table 200 of FIG. 2 is achieved by having second selective coupler 160, fourth selective coupler 164, and eighth selective coupler 172 in an engaged configuration and first selective coupler 158, third selective coupler 162, fifth selective coupler 166, sixth selective coupler 168, and seventh selective coupler 170 in a disengaged configuration. Therefore, when transitioning between the sixteenth forward gear or speed ratio and the seventeenth forward gear or speed ratio, third selective coupler 162 is placed in the disengaged configuration and fourth selective coupler 164 is placed in the engaged configuration.

An eighteenth or subsequent forward gear or speed ratio (shown as 18$^{th}$) in exemplary truth table 200 of FIG. 2 is achieved by having second selective coupler 160, sixth selective coupler 168, and eighth selective coupler 172 in an engaged configuration and first selective coupler 158, third selective coupler 162, fourth selective coupler 164, fifth selective coupler 166, and seventh selective coupler 170 in a disengaged configuration. Therefore, when transitioning between the seventeenth forward gear or speed ratio and the eighteenth forward gear or speed ratio, fourth selective coupler 164 is placed in the disengaged configuration and sixth selective coupler 168 is placed in the engaged configuration.

In each of the 1$^{st}$ through 18$^{th}$ forward gear or speed ratios, at least three of selective couplers 158-172 are in an engaged configuration. More specifically, seventh selective coupler 170 is in an engaged configuration and eighth selective coupler 172 is in a disengaged configuration in each of the 1$^{st}$ through 9$^{th}$ forward gear or speed ratios. For each of the 10$^{th}$-18$^{th}$ forward gear or speed ratios, eighth selective coupler 172 is in an engaged configuration and seventh selective coupler 170 is in a disengaged configuration. Therefore, placing seventh selective coupler 170 in a disengaged configuration and placing eighth selective coupler 172 in an engaged configuration while maintaining the selective engagement of selective couplers 158-168 for each of the 1$^{st}$ through 9$^{th}$ forward gear or speed ratios establishes an additional forward gear or speed ratio having a different gear ratio. The interconnections between selective couplers 170, 172, and fifth planetary gearset 216 are responsible for establishing the additional forward gear or speed ratios. Accordingly, fifth planetary gearset 216 may be referred to as a splitter planetary gearset.

The present disclosure contemplates that downshifts follow the reverse sequence of the corresponding upshift (as described above). Further, several power-on skip-shifts that are single-transition are possible (e.g. from 1$^{st}$ up to 3$^{rd}$, from 3$^{rd}$ down to 1$^{st}$, from 3$^{rd}$ up to 5$^{th}$, and from 5$^{th}$ down to 3$^{rd}$).

In the illustrated embodiment, various combinations of three of the available selective couplers are engaged for each of the illustrated forward and reverse gear or speed ratios. Additional forward gear or speed ratios and reverse gear or speed ratios are possible based on other combinations of engaged selective couplers. Although in the illustrated embodiment, each forward gear or speed ratio and reverse gear or speed ratio has three of the available selective couplers engaged, it is contemplated that less than three and more than three selective couplers may be engaged at the same time.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transmission comprising:
   at least one stationary member;
   an input member rotatable relative to the at least one stationary member;
   a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, a fourth planetary gearset, and a fifth planetary gearset, the input member is fixedly coupled to only the first gearset component of the first planetary gearset of the plurality of planetary gearsets, the first gearset component of the first planetary gearset is a sun gear;
   an output member operatively coupled to the input member through the plurality of planetary gearsets and rotatable relative to the at least one stationary member, the output member is fixedly coupled to only the fifth planetary gearset of the plurality of planetary gearsets; and
   a plurality of selective couplers, wherein the plurality of selective couplers includes a first number of clutches and a second number of brakes, wherein the second number is greater than the first number, and one of the plurality of selective couplers selectively couples the fourth planetary gearset to the fifth planetary gearset independent of the output member, wherein the plurality of selective couplers includes a first selective coupler which, when engaged, fixedly couples the input member to the third planetary gearset of the plurality of planetary gearsets.

2. The transmission of claim 1, wherein the third planetary gearset of the plurality of planetary gearsets is fixedly coupled to the first planetary gearset of the plurality of planetary gearsets independent of the first selective coupler.

3. The transmission of claim 1, wherein, when the first selective coupler is engaged, the input member is further fixedly coupled to the fourth planetary gearset of the plurality of planetary gearsets.

4. The transmission of claim 3, wherein the third planetary gearset of the plurality of planetary gearsets is fixedly coupled to the first planetary gearset of the plurality of planetary gearsets independent of the first selective coupler.

5. The transmission of claim 3, wherein the plurality of selective couplers includes a second selective coupler which, when engaged, fixedly couples the input member to the fourth planetary gearset of the plurality of planetary gearsets independent of third planetary gearset of the plurality of planetary gearsets.

6. The transmission of claim 1, wherein the plurality of selective couplers includes a second selective coupler which, when engaged, fixedly couples the input member to the fourth planetary gearset of the plurality of planetary gearsets.

7. The transmission of claim 1, further comprising a first interconnector which fixedly couples the second gearset component of the first planetary gearset, the second gearset component of the second planetary gearset, and the third gearset component of the third planetary gearset together.

8. The transmission of claim 1, further comprising an interconnector which fixedly couples the third gearset component of the first planetary gearset and the first gearset component of the second planetary gearset together.

9. The transmission of claim 7, further comprising a second interconnector which fixedly couples the third gearset component of the first planetary gearset and the first gearset component of the second planetary gearset together.

10. The transmission of claim 9, further comprising:
a third interconnector which fixedly couples the second gearset component of the third planetary gearset and the third gearset component of the fourth planetary gearset together;
a fourth interconnector which fixedly couples the first gearset component of the third planetary gearset and the first planetary gearset component of the fourth planetary gearset together; and
a fifth interconnector which fixedly couples the second gearset component of the fourth planetary gearset and the first gearset component of the fifth planetary gearset together.

11. The transmission of claim 1, wherein the second number is 2 more than the first number.

12. The transmission of claim 11, wherein the second number is 5 and the first number is 3.

13. The transmission of claim 1, wherein each of the first planetary gearset, the second planetary gearset, the third planetary gearset, the fourth planetary gearset, and the fifth planetary gearset is a simple planetary gearset.

14. The transmission of claim 13, wherein:
the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear;
the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier; and
the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

15. The transmission of claim 1, wherein the at least one stationary member includes a housing, the housing having a first end and a second end, wherein
the input member is positioned proximate the first end of the housing;
the output member is positioned proximate the second end of the housing;
the first planetary gearset, the second planetary gearset, the third planetary gearset, and the fourth planetary gearset are positioned between the first end of the housing and the fifth planetary gearset; and
the fifth planetary gearset is positioned between the first planetary gearset, the second planetary gearset, the third planetary gearset, and the fourth planetary gearset and the second end of the housing.

16. The transmission of claim 15, wherein
the first planetary gearset is positioned between the first end of the housing and the second planetary gearset;
the second planetary gearset is positioned between the first planetary gearset and the third planetary gearset;
the third planetary gearset is positioned between the second planetary gearset and the fourth planetary gearset; and
the fourth planetary gearset is positioned between the third planetary gearset and the fifth planetary gearset.

17. The transmission of claim 1, wherein the plurality of selective couplers are selectively engaged in a plurality of combinations to establish at least eighteen forward speed ratios and at least two reverse speed ratios between the input member and the output member, each of the plurality of combinations having at least three of the plurality of selective couplers engaged.

18. A transmission comprising:
at least one stationary member;
an input member rotatable relative to the at least one stationary member;
a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, a fourth planetary gearset, and a fifth planetary gearset, the input member is fixedly coupled to the first gearset component of the first planetary gearset;

an output member operatively coupled to the input member through the plurality of planetary gearsets and rotatable relative to the at least one stationary member, the output member is fixedly coupled to the second gearset component of the fifth planetary gearset;

a first interconnector which fixedly couples the second gearset component of the first planetary gearset, the second gearset component of the second planetary gearset, and the third gearset component of the third planetary gearset together;

a second interconnector which fixedly couples the third gearset component of the first planetary gearset and the first gearset component of the second planetary gearset together;

a third interconnector which fixedly couples the second gearset component of the third planetary gearset and the third gearset component of the fourth planetary gearset together;

a fourth interconnector which fixedly couples the first gearset component of the third planetary gearset and the first planetary gearset component of the fourth planetary gearset together;

a fifth interconnector which fixedly couples the second gearset component of the fourth planetary gearset and the first gearset component of the fifth planetary gearset together; and a plurality of selective couplers, wherein the plurality of selective couplers includes:

a first selective coupler which, when engaged, fixedly couples the input member and the first gearset component of the first planetary gearset to the first gearset component of the third planetary gearset and the first gearset component of the fourth planetary gearset;

a second selective coupler which, when engaged, fixedly couples the input member and the first gearset component of the first planetary gearset to the second gearset component of the third planetary gearset and the third gearset component of the fourth planetary gearset;

a third selective coupler which, when engaged, fixedly couples the third gearset component of the first planetary gearset and the first gearset component of the second planetary gearset to the at least one stationary member;

a fourth selective coupler which, when engaged, fixedly couples the second gearset component of the first planetary gearset, the second gearset component of the second planetary gearset, and the third gearset component of the third planetary gearset to the at least one stationary member;

a fifth selective coupler which, when engaged, fixedly couples the second gearset component of the third planetary gearset and the third gearset component of the fourth planetary gearset to the at least one stationary member;

a sixth selective coupler which, when engaged, fixedly couples the third gearset component of the second planetary gearset to the at least one stationary member;

a seventh selective coupler which, when engaged, fixedly couples the second gearset component of the fourth planetary gearset and the first gearset component of the fifth planetary gearset to the second gearset component of the fifth planetary gearset; and an eighth selective coupler which, when engaged, fixedly couples the third gearset component of the fifth planetary gearset to the at least one stationary member.

19. The transmission of claim 18, wherein each of the first planetary gearset, the second planetary gearset, the third planetary gearset, the fourth planetary gearset, and the fifth planetary gearset is a simple planetary gearset.

20. The transmission of claim 19, wherein:

the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear;

the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier; and the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

21. The transmission of claim 18, wherein the at least one stationary member includes a housing, the housing having a first end and a second end, wherein the input member is positioned proximate the first end of the housing;

the output member is positioned proximate the second end of the housing;

the first planetary gearset, the second planetary gearset, the third planetary gearset, and the fourth planetary gearset are positioned between the first end of the housing and the fifth planetary gearset; and the fifth planetary gearset is positioned between the first planetary gearset, the second planetary gearset, the third planetary gearset, and the fourth planetary gearset and the second end of the housing.

22. The transmission of claim 21, wherein the first planetary gearset is positioned between the first end of the housing and the second planetary gearset;

the second planetary gearset is positioned between the first planetary gearset and the third planetary gearset;

the third planetary gearset is positioned between the second planetary gearset and the fourth planetary gearset; and the fourth planetary gearset is positioned between the third planetary gearset and the fifth planetary gearset.

23. The transmission of claim 18, wherein the plurality of selective couplers are selectively engaged in a plurality of combinations to establish at least eighteen forward speed ratios and at least two reverse speed ratios between the input member and the output member, each of the plurality of combinations having at least three of the plurality of selective couplers engaged.

24. A transmission comprising:

at least one stationary member;

an input member rotatable relative to the at least one stationary member;

a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, a fourth planetary gearset, and a fifth planetary gearset, the input member is fixedly coupled to only the first planetary gearset of the plurality of planetary gearsets;

an output member operatively coupled to the input member through the plurality of planetary gearsets and rotatable relative to the at least one stationary member, the output member is fixedly coupled to only the fifth planetary gearset of the plurality of planetary gearsets; and a plurality of selective couplers, wherein the plurality of selective couplers includes a first number of clutches and a second number of brakes, wherein the second number is greater than the first number, and one of the plurality of selective couplers selectively couples the fourth planetary gearset to the fifth planetary gearset independent of the output member, wherein the plurality of selective couplers includes:

a first selective coupler which, when engaged, fixedly couples the input member and the first gearset component of the first planetary gearset to the first gearset component of the third planetary gearset and the first gearset component of the fourth planetary gearset;

a second selective coupler which, when engaged, fixedly couples the input member and the first gearset component of the first planetary gearset to the second gearset component of the third planetary gearset and the third gearset component of the fourth planetary gearset;

a third selective coupler which, when engaged, fixedly couples the third gearset component of the first planetary gearset and the first gearset component of the second planetary gearset to the at least one stationary member;

a fourth selective coupler which, when engaged, fixedly couples the second gearset component of the first planetary gearset, the second gearset component of the second planetary gearset, and the third gearset component of the third planetary gearset to the at least one stationary member;

a fifth selective coupler which, when engaged, fixedly couples the second gearset component of the third planetary gearset and the third gearset component of the fourth planetary gearset to the at least one stationary member;

a sixth selective coupler which, when engaged, fixedly couples the third gearset component of the second planetary gearset to the at least one stationary member;

a seventh selective coupler which, when engaged, fixedly couples the second gearset component of the fourth planetary gearset and the first gearset component of the fifth planetary gearset to the second gearset component of the fifth planetary gearset; and an eighth selective coupler which, when engaged, fixedly couples the third gearset component of the fifth planetary gearset to the at least one stationary member.

* * * * *